United States Patent [19]
Brackett et al.

[11] Patent Number: 5,953,495
[45] Date of Patent: Sep. 14, 1999

[54] SYSTEM AND METHOD FOR FILTERING OUTPUT OF A CATHODE RAY TUBE

[75] Inventors: Gary L. Brackett, Canon City; Kerry L. Shaklee, Brighton, both of Colo.

[73] Assignee: Sienna Imaging, Inc., Englewood, Colo.

[21] Appl. No.: 08/877,230

[22] Filed: Jun. 17, 1997

Related U.S. Application Data

[60] Provisional application No. 60/020,024, Jun. 19, 1996.

[51] Int. Cl.[6] .................................................. G06K 15/00
[52] U.S. Cl. .......................................... 395/108; 395/109
[58] Field of Search .................................. 395/101, 106, 395/107, 108, 109, 116, 111; 347/115, 119, 232, 246, 133; 345/153, 154; 358/507, 512, 518, 519, 523, 530, 485, 534

[56] References Cited

U.S. PATENT DOCUMENTS

| | | | |
|---|---|---|---|
| 3,612,753 | 4/1969 | Kormam | 358/534 |
| 3,693,931 | 10/1972 | Horowitz | 117/47 R |
| 5,232,748 | 8/1993 | Horowitz et al. | 427/553 |
| 5,313,211 | 5/1994 | Appel et al. | 358/501 |

*Primary Examiner*—Arthur G. Evans
*Attorney, Agent, or Firm*—James R. Young

[57] ABSTRACT

A printer for transferring image data from a computer to a print media. The printer displays the image data in line segments on the CRT, which then transfers the image line segments of the image onto the media, as the media moves across the cathode ray tube. The segments are used to illuminate phosphor rows on an inside surface of the cathode ray tube, and filters, chemically bonded to an outside surface of the cathode ray tube, adjust the spectral output of the phosphor rows to match the spectral requirements of the print media. The filters may be short pass, long pass, or band pass to achieve the required adjustments to the light so that the print media is properly exposed. Protrusions are formed on the edges of the filters to act as spacers between the filters and the print media.

13 Claims, 8 Drawing Sheets

SYSTEM AND METHOD FOR FILTERING OUTPUT OF A CATHODE RAY TUBE

This application claims priority from Provisional Application No. 60/020024 filed on Sept. 19, 1996.

FIELD OF THE INVENTION

This invention relates to printers for computer systems and more particularly to Cathode Ray Tube (CRT) display subsystems within such printers. Even more particularly, the present invention relates to a system and method for filtering the output of a CRT to match the color spectrum output to a print media.

BACKGROUND OF THE INVENTION

Photographic process printers use a cathode ray tube (CRT) to project an image onto a photosensitive media. After the image is projected onto the media, the media is processed to develop the latent image. In order to transfer the image from the surface of the CRT to the surface of the media while maintaining image focus, an array of optical fibers are adapted to transfer the light from the surface of the CRT to the surface of the media.

The phosphors used to provide color output of a CRT may not match the color spectrum necessary to properly expose the print media. To better match the light spectrum output of the CRT to the light spectrum required by the print media, filters are needed between the phosphor of the CRT and the print media.

Figure 2:
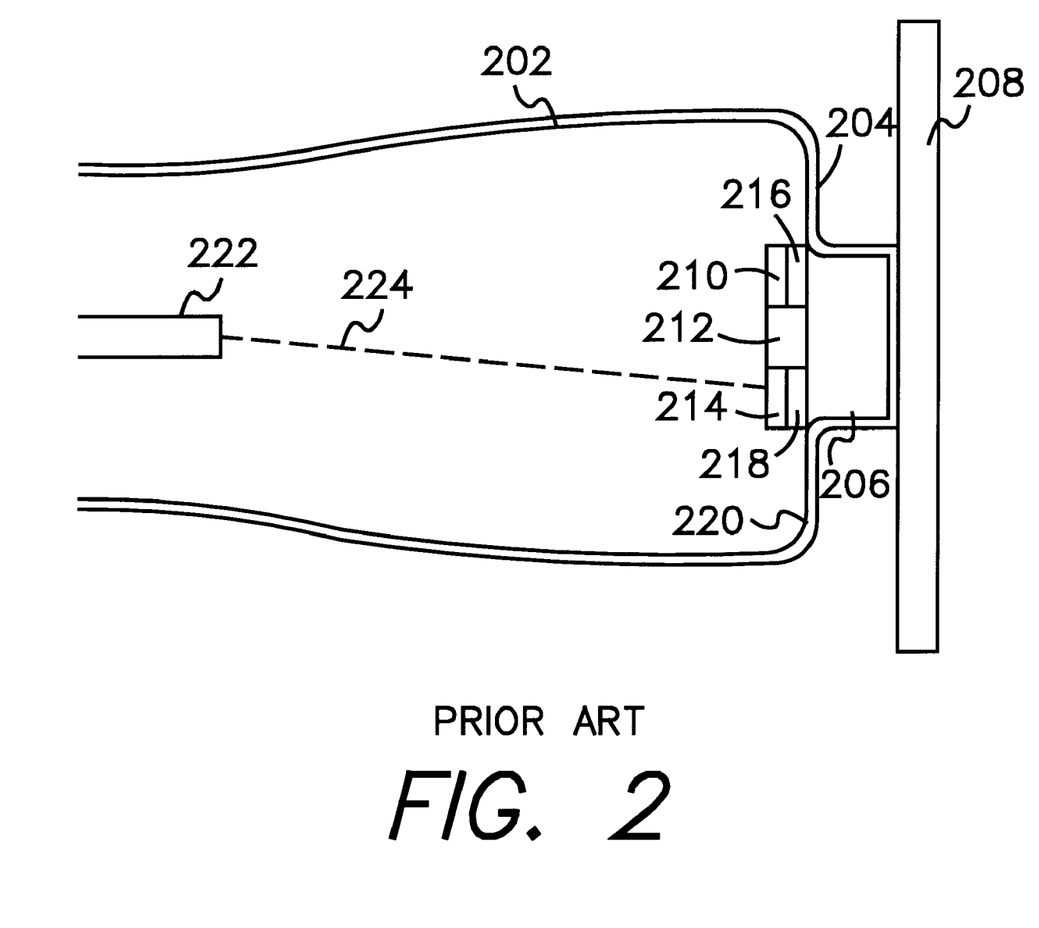
FIG. 2 shows a prior art system of placing filters inside the CRT envelope.

FIG. 2 shows a prior art method of using filters to optically match the spectrum output of a CRT to the spectrum requirements of a print media. FIG. 2 shows a CRT glass envelope 202 having a CRT face 204, which is the outside surface of the CRT glass envelope 202. An array of optical fibers 206 is built into the CRT 202 and is arranged to transfer the light from the CRT to the surface of a print media 208.

When constructing the CRT 202, filters 216 and 218 are first formed on the inside surface 220 of the CRT 202, which is also the inside surface of the array of optical fibers 206. These filters are typically dichroic filters vacuum deposited onto the inside surface 220 of the glass envelope 202. CRT phosphors 210 and 214 are then formed on top of the filters 216 and 218 such that the electron beam 224 emanating from and electron gun 222 will first strike the phosphor to create light, and then the light will be filtered by the filter before the light emits from the face 204 of the CRT.

FIG. 2 shows three phosphors 210, 212, and 214, with two filters 216 and 218 used to filter the output of two of the phosphors. The third phosphor 212 is formed directly on the inside surface 220 of the CRT, indicating that no filtering is needed to match the spectrum output of this phosphor to the spectrum needed to properly expose the print media 208 for the color produced by phosphor 212.

Forming the filters 216 and 218 on the inside surface 220 of the CRT creates significant problems. The filters must be formed onto the CRT at the beginning of the process of constructing the CRT, because the filters must be deposited on the inside surface of the CRT prior to the phosphors being formed on the inside surface of the CRT. This is necessary in order to allow the electron beam 224 emanating from the electron gun 222 in the rear of the CRT to first strike the phosphor in order to provide light. The light output of the phosphor must then be filtered before it is emitted through the front of the CRT. Since the filters must be formed first, they must be formed before the phosphor coating is known to be good, thus, causing yield problems in the CRT production.

Another problem with forming the filters on the inside surface 220 of the CRT is that the process used, vacuum deposition, is an expensive process.

It is thus apparent that there is a need in the art for an improved method or apparatus that allows filters to be placed on a CRT after the phosphor coating has been placed on the CRT, thus after the CRT is known to have good phosphor coatings. Another need in the art is for a method of creating the filters that does not use vacuum deposition. The present invention meets these and other needs in the art.

SUMMARY OF THE INVENTION

It is an aspect of the present invention to provide a filter for the light output of a CRT.

It is another aspect of the invention to locate such filter outside the glass envelope of the CRT.

Another aspect of the invention is to chemically bond the filter to the glass of the CRT envelope.

A further aspect of the invention is to construct the filter in a manner that provides a protrusion on an edge of the filter.

A still further aspect of the invention is to use such protrusion to space a print media away from the filter.

The above and other aspects of the invention are accomplished in a printer for transferring image data from a host computer system to a print media, wherein the print media is moved linearly through the printer as the image is transferred to the media, and further wherein the image data is transferred to the printer as image line segments. The printer contains a memory for storing the image data that it receives from a host computer system. The printer displays the image data in line segments on a cathode ray tube (CRT), which transfers the image line segments of the image onto the print media, as the media moves across the CRT. The image line segments are used to illuminate phosphor rows on an inside surface of the CRT, and filters, attached to an outside surface of the CRT, adjust the spectral output of the phosphor rows to match the spectral requirements of the print media.

The filters may be short pass, long pass, or band pass to achieve the required adjustments to the light so that the print media is properly exposed. The filters are chemically bonded to the outside surface of the glass envelope of the CRT, so that they are hard enough to resist wear from the print media and hard enough to resist wear when being cleaned.

Protrusions are formed on the edges of the filters to act as spacers between the filters and the print media. Optionally, separate spacers may be provided to protect the filters, or to simply space the media farther away from the CRT and filters.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
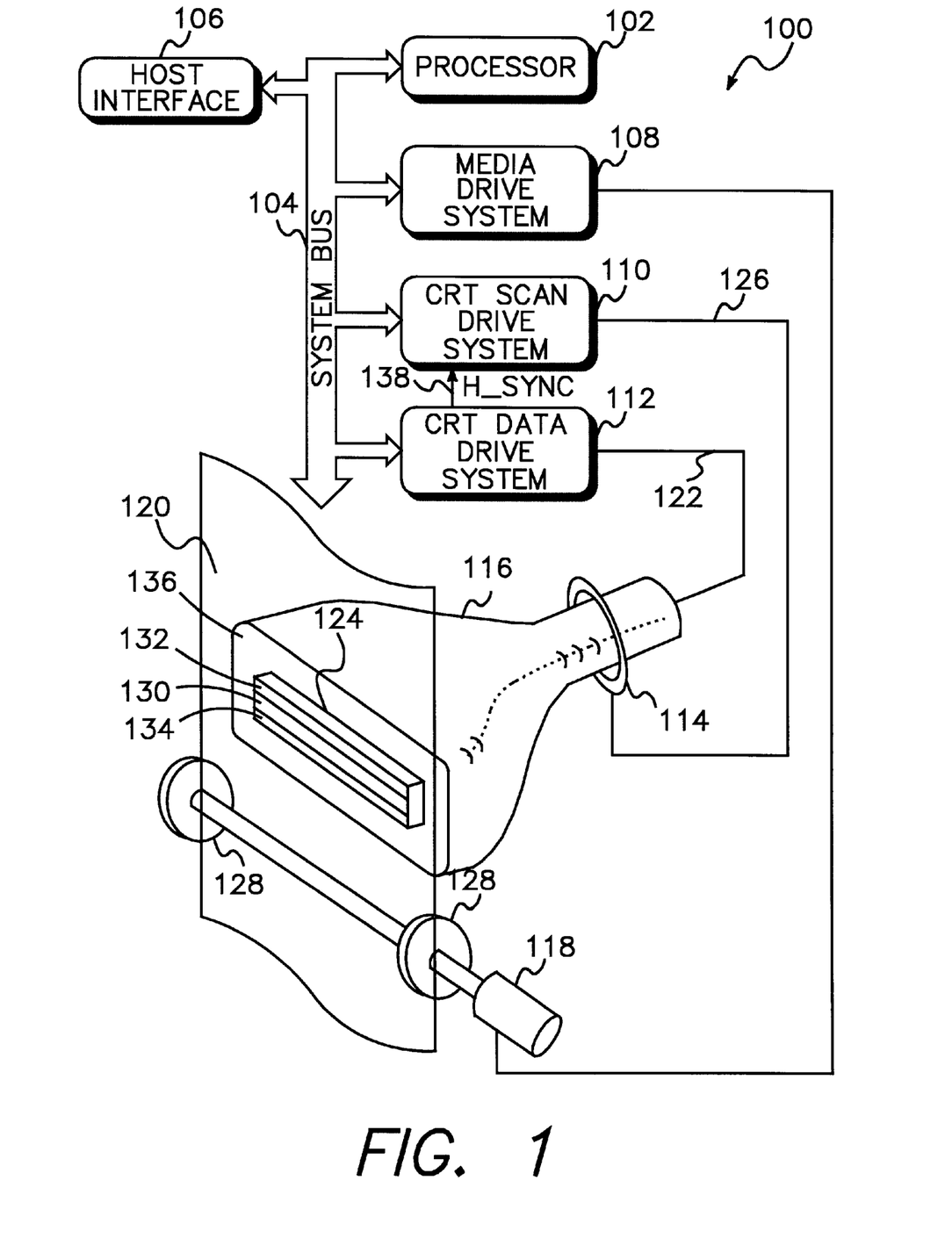
FIG. 1 shows a block diagram of a printer incorporating the present invention.

FIG. 1 shows a block diagram of a printer incorporating the present invention. Referring now to FIG. 1, a printer 100 contains a processor 102 which communicates to other components of the printer over a system bus 104. The processor 102 uses a host interface 106 to receive data from a host system (not shown), and the processor 102 stores this data in a CRT data drive system 112. The output 122 of the CRT data drive system 112 is connected to a CRT 116 and used to modulate an electron beam within the CRT 116. Data displayed on the face 136 of the CRT 116 is conducted through a CRT fiber optic faceplate 124 to print media 120. The print media 120 is a photosensitive media capable of recording the image displayed on the CRT and conducted through the CRT fiber optic faceplate 124.

Deflection of the electron beam of the CRT 116 is controlled by a CRT scan drive system 110 whose output 126 is connected to a yoke 114 of the CRT 116. The CRT data drive system 112 controls the start of each horizontal trace through an H_SYNC signal 138. The present invention comprises filters 132 and 134 attached to a front surface of the fiber optic faceplate 124, or alternatively, attached to a front surface 136 of the CRT 116 in the absence of a fiber optic faceplate 124.

The print media 120 is moved by paper rollers 128 which are powered by a motor 118. The motor 118 is operated by a paper drive system 108 which is controlled over the system bus 104 by the processor 102.

Operation of the system begins when data is received over the host interface 106. The processor 102 takes the data from the host interface 106 and stores the data in the CRT drive system 112. The CRT drive system 112 converts the data to a series of dot rows, called line segments, of a suitable color or colors to produce the image desired. The paper drive system 108 is then used to position the media 120 in front of either a red, green, or blue phosphor stripe on the face of the fiber optic faceplate 124. The CRT scan drive system 110 is then activated to scan the electron beam across the appropriate phosphor stripe while the CRT data drive system 112 modulates the CRT beam intensity to expose the print media.

The phosphors used in the phosphor stripes to provide color output of the CRT 116 often do not provide a color spectrum output that matches the color spectrum necessary to properly expose the print media 120. To better match the light spectrum output of the phosphor stripes to the light spectrum required by the print media 120, filters 132 and 134 are needed between the phosphor fiber optic faceplate 124 and the print media 120.

After exposing one line segment of the print media, the print media is then moved a fixed distance, and the process is repeated for one of the other colors. One line segment of data is complete after all three phosphors—red, green, and blue—have been displayed on a line segment of the print media.

FIG. 2 shows a prior art method of using filters to optically match the spectrum output of a CRT to the spectrum requirements of a print media. FIG. 2 shows a CRT glass envelope 202 having a CRT face 204, which is the outside surface of the CRT glass envelope 202. An array of optical fibers 206 is built into the CRT 202 and is arranged to transfer the light from the CRT to the surface of a print media 208.

When constructing the CRT 202, filters 216 and 218 are first formed on the inside surface 220 of the CRT 202, which is also the inside surface of the array of optical fibers 206. These filters are typically dichroic filters formed by vacuum deposition onto the inside surface 220 of the glass envelope 202. CRT phosphors 210 and 214 are then formed on top of the filters 216 and 218 such that the electron beam 224 emanating from and electron gun 222 will first strike the phosphor to create light, and then the light will be filtered by a filter before the light emits from the face 204 of the CRT. Filters are only used when necessary, as shown by phosphor stripe 212 having no filter. Filters are not necessary if the light spectrum output of the phosphor for a particular color matches the light spectrum needed to properly expose the print media for the color.

FIG. 2 shows three phosphors 210, 212, and 214, with two filters 216 and 218 used to filter the output of two of the phosphors. The third phosphor 212 is formed directly on the inside surface 220 of the CRT, indicating that no filtering is needed to match the spectrum output of this phosphor to the spectrum needed to properly expose the print media 208 for the color produced by phosphor 212.

Forming the filters 216 and 218 on the inside surface 220 of the CRT creates significant problems. The filters must be formed onto the CRT at the beginning of the process of constructing the CRT, because the filters must be deposited on the inside surface of the CRT prior to the phosphors being formed on the inside surface of the CRT. This is necessary in order to allow the electron beam 224 emanating from the electron gun 222 in the rear of the CRT to first strike the phosphor in order to provide light. The light output of the phosphor must then be filtered before it is emitted through the front of the CRT. Since the filters must be formed first, they must be formed before the phosphor coating is known to be good, thus, causing yield problems in the CRT production.

Figure 3:
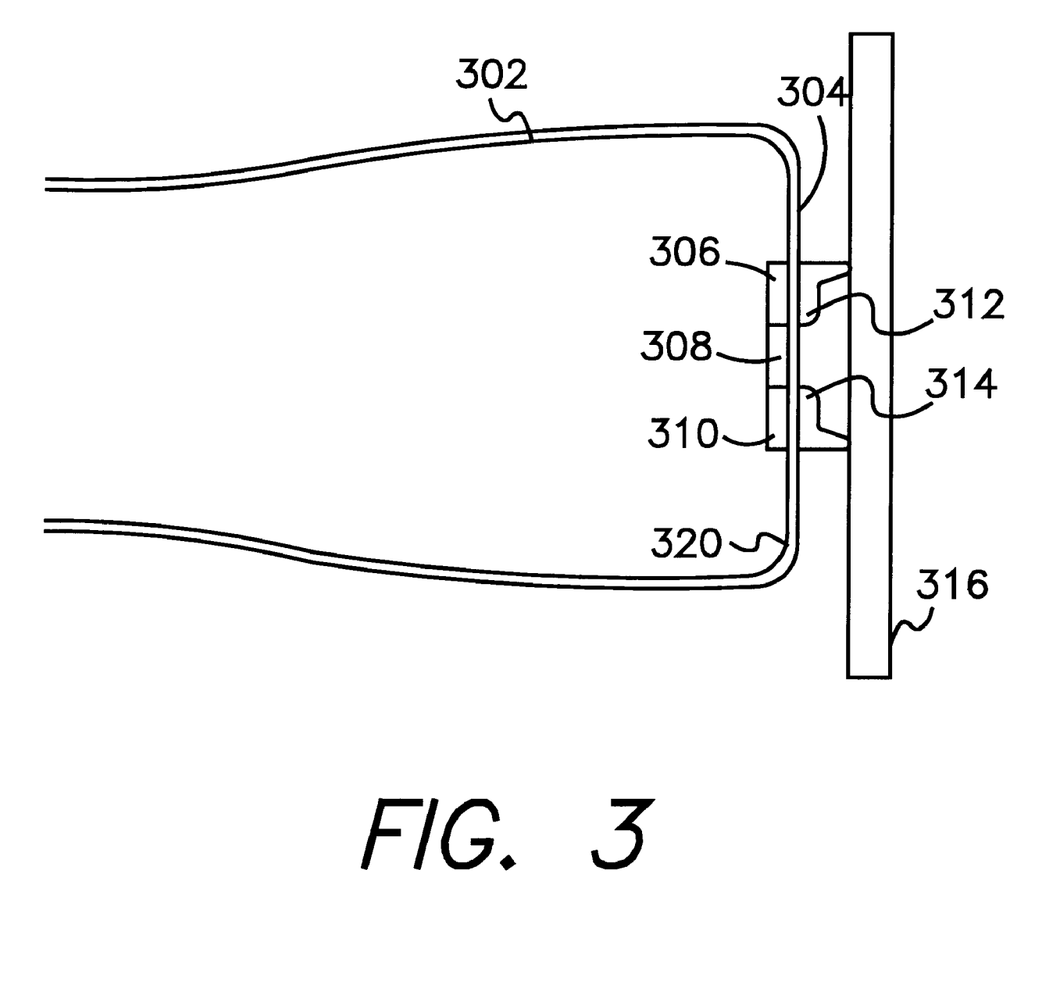
FIG. 3 shows the system of the present invention for placing filters outside the glass envelope of the CRT.

FIG. 3 shows the system of the present invention for placing filters outside the glass envelope of the CRT. Referring now to FIG. 3, a cathode ray tube (CRT) 302 is shown having a front face 304, located on the outside of the glass envelope of the CRT 302 and an inside surface 320 located on the inside of the glass envelope of the CRT 302. Phosphor coatings for three different color phosphors 306, 308, and 310 are placed on the inside 320 of the glass envelope of the CRT 302 so they can be readily struck by the electron beam (not shown). Two filters 312 and 314 have been bonded to the outside front face 304 of the glass envelope of the CRT 302. These filters may be chemically bonded to the front face 304 or may be deposited on the front face 304 using vacuum deposition. Although two filters, 312 and 314, are shown, those skilled in the art will recognize that filters may be needed for each of the three phosphors 306, 308, or 310 or filters may be only needed for one of the phosphors, depending upon the spectral output of the phosphors compared to the spectral requirements of the print media 316.

One method of chemically bonding the filters to the front face 304 is described in Appendix A attached hereto and incorporated herein by reference. Another method of chemically bonding the filters to the front face 304 is disclosed in U.S. Pat. No. 3,693,931 of Horowitz, et al. entitled "Method of Grafting Polymerizable Monomers onto Substrates", issued Oct. 17, 1972. Still another method of chemically bonding the filters is disclosed in U.S. Pat. No. 5,232,748 of Horowitz, et al., entitled "Method of Grafting Polymerizable Monomers onto Substrates", issued Aug. 3, 1993.

The filters 312 and 314 may be long pass filters, which pass only the long, or red, wavelengths of light, or they may be short pass filters, that pass only the short, or blue, wavelengths of light. They may alto be bandpass filters that pass only selective wavelengths of light.

The filters may also be a composite of multiple filters, one attached on top of another. By using multiple filters, a bandpass filter may be constructed by combining short pass and long pass filters to create a bandpass filter.

Figure 4:
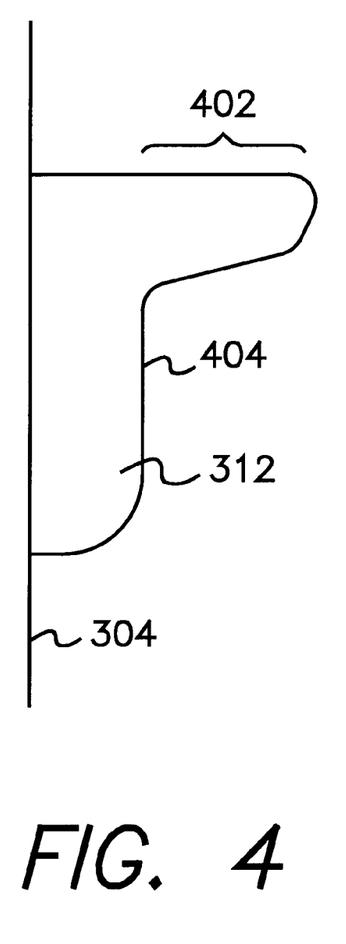
FIG. 4 shows a detail drawing of the filter, and illustrates protrusions that are formed on the filter of the present invention.

The print media 316 needs to be spaced away from the filters 312 and 314 both for reasons of preventing excessive wear, and for optical reasons to prevent a newton ring effect. This spacing can be accomplished in several ways. One of the ways to accomplish the spacing is to form protrusions onto one or more of the filters. FIG. 4 shows an expanded diagram of the filter 312 of FIG. 3. Referring now to FIG. 4, the filter 312 is shown having a protrusion 402 that extends above the optical surface 404 of the filter 312. This protrusion 402 is formed as a part of the process for creating the filter 312 and is thus an integral part of the filter 312. One way of forming these protrusions is described below with respect to FIG. 8.

Figure 5:
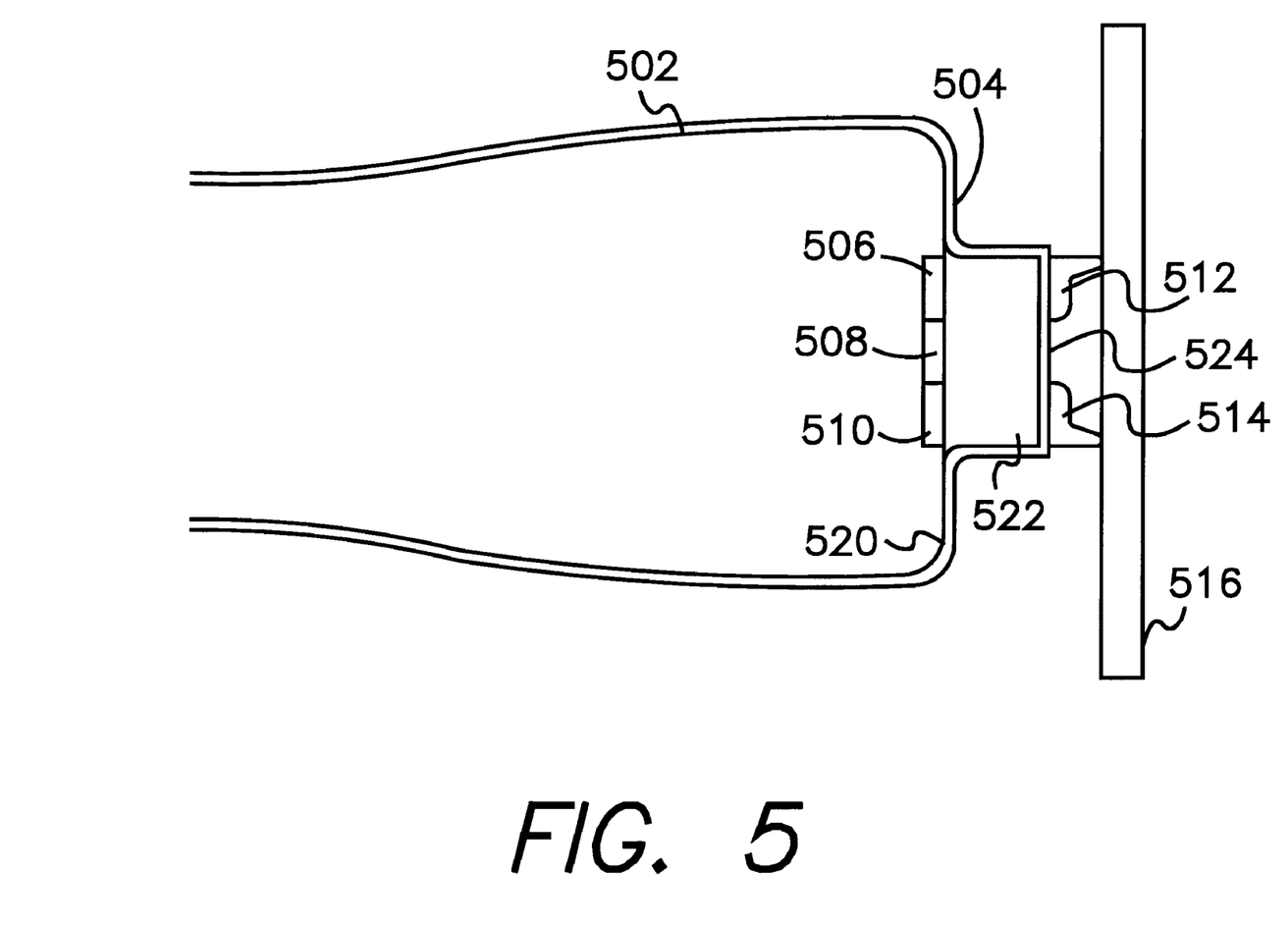
FIG. 5 shows the filters of the present invention used with a fiber optic faceplate.

FIG. 5 shows the filters of the present invention when used with a fiber optic faceplate. Referring now to FIG. 5, a CRT 502 is shown having a face 504 on the outside surface of the glass envelope of the CRT 502. Three bands of phosphor coatings 506, 508, and 510 are attached to an inside surface 520 of the glass envelope of the CRT 502, which is also the inside surface of a fiber optic faceplace 522. The fiber optic faceplate 522 is used to conduct light emitted by the phosphors 506, 508, and 510 away from the front face 504 of the CRT 502 to the print media 516. Attached to a front surface 524 of the fiber optic faceplate 522 are a pair of filters 512 and 514. In front of the filters 512 and 514 is the print media 516 onto which the image is projected.

Figure 6:
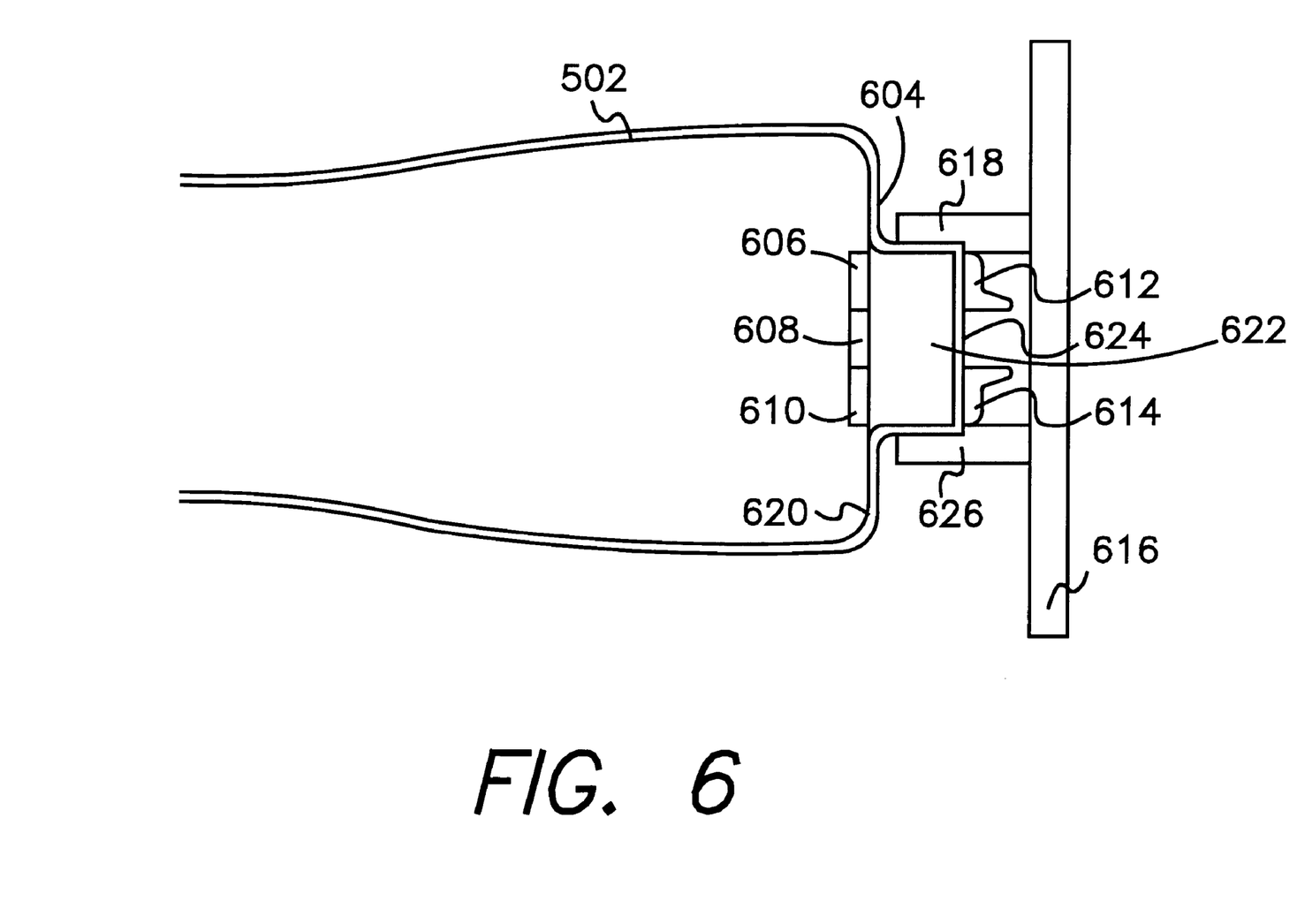
FIG. 6 shows the filters of the present invention used with additional spacer devices for spacing the print media away from the filters of the present invention.

FIG. 6 shows the filters of the present invention used with additional spacer devices for spacing the print media away from the filters. Referring now to FIG. 6, a CRT 602 is shown having a front surface 604 and three phosphor bands 606, 608, and 610 attached to an inside surface 620 of the glass envelope of the CRT 602. A fiber optic faceplate 622 is formed into the outside surface 604 of the CRT 602 to conduct light away from the CRT in the same manner as discussed above with respect to FIG. 5. Filters 612 and 614 are attached to the outside surface 625 of the fiber optic faceplate 622 to filter light as it passes from the fiber optic faceplate 622 to the print media 616. Attached to the fiber optic faceplate 622 are a pair of spacers 618 and 626 used to space the print media 616 away from the fiber optic faceplate 622 and also away from the filters 612 and 614. The spacers 618 and 626 are an alternative to the protrusions discussed above with respect to FIG. 4.

Figure 7:
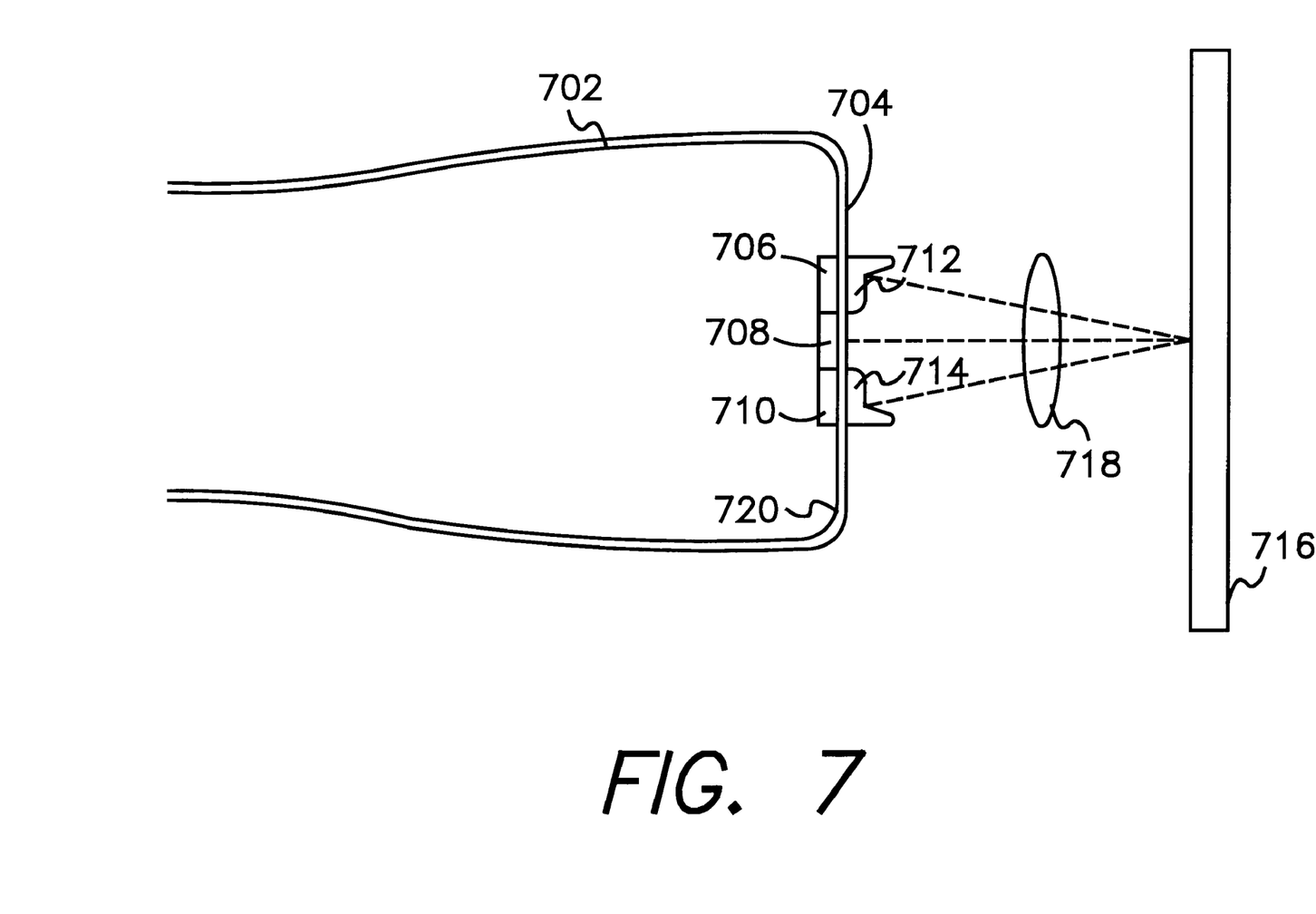
FIG. 7 shows the filters of the present invention used with optical coupling of the light output of the CRT to the print media.

FIG. 7 shows the filters of the present invention used with optical coupling of the light output of the CRT to the print media. Referring now to FIG. 7, a CRT 702 is shown having an outside front surface 704. Attached to an inside surface 720 of the glass envelope of the CRT 702 are three phosphors 706, 708, and 710. Two filters 712 and 714 are attached to the outside surface 704 of the glass envelope of the CRT 702. Light emitted by the phosphor band 706, 708, and 710, and filtered by the filter 712 and 714, passes through a lens 718 before striking the print media 716. The lens 718 allows the print media 716 to be placed away from the front face 704 of the CRT at distances greater than can be used when the fiber optic faceplate is used.

Figure 8:
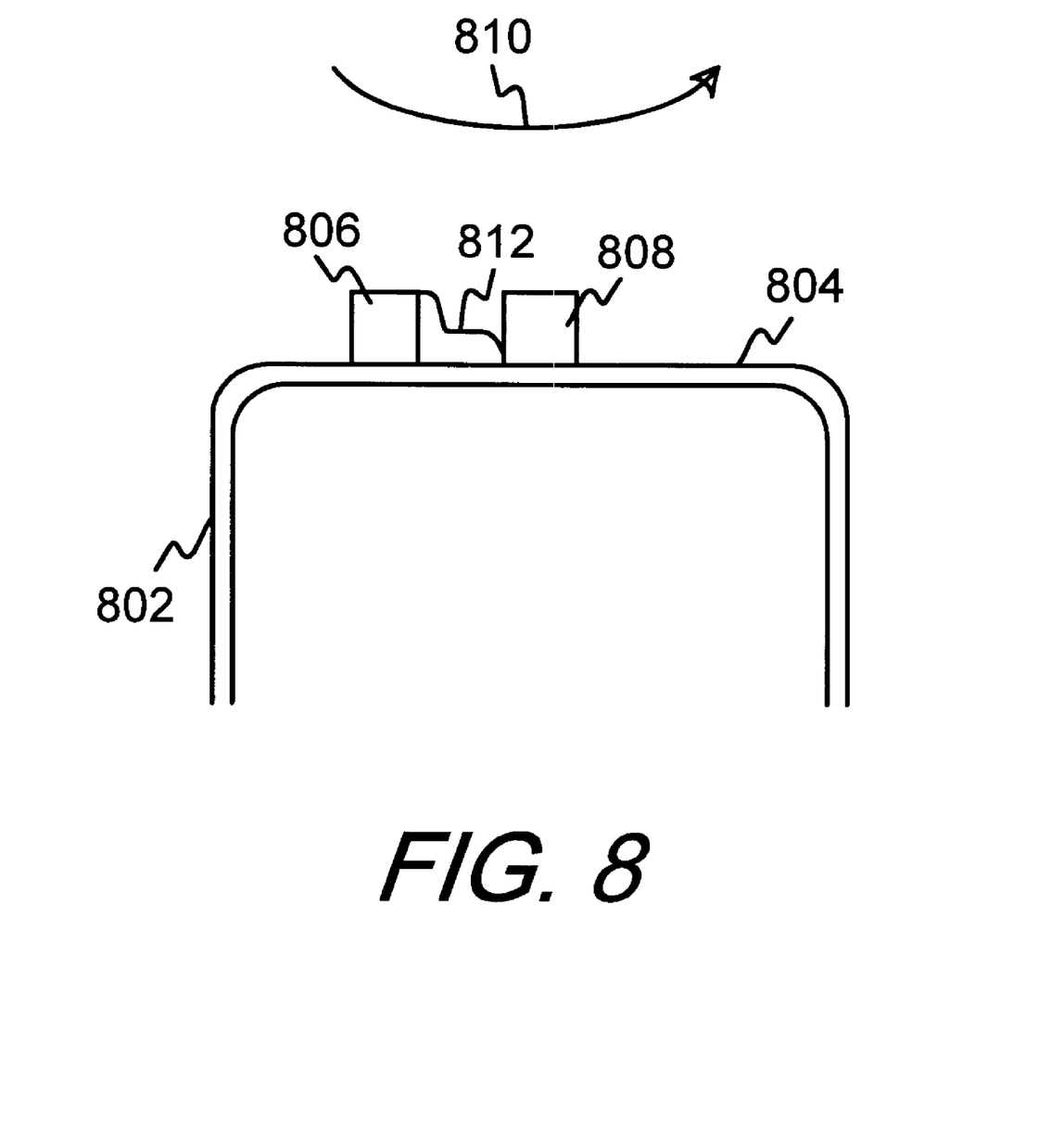
FIG. 8 shows a filter being formed on the surface of the CRT and illustrates the mask around the filter that causes the protrusion to form.

FIG. 8 shows a filter being formed on the surface of a CRT, and illustrates the mask used to contain the filter and form the protrusion. Referring to FIG. 8, a CRT 802 is shown having an outside front surface 804. A filter 812 is shown being formed on the surface 804 of the CRT 802. A mask 806 and 808 is used to contain the material being used to form the filter. The mask is actually completely surrounds the filter, but only two sides 806 and 808 are shown in this cutaway view. When forming the filter, the CRT 802 is spun, in the direction of arrow 810 to force the filter material toward the surface 804, and this causes the side 806 of the mask to form a dam that allows filter material to build up next to the mask, thus forming the protrusions. A higher spinning rate forms a thinner filter, while a lower spinning rate forms a thicker filter, thus the rate of spin controls the thickness of the filter.

The spectral characteristics of the filters are controlled by the amount of dye used in the material that forms the filter.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A printer for transferring image data from a host computer system to a print media, wherein said print media is moved linearly through said printer as said image is transferred to said media, and further wherein said image data is transferred to said printer as image line segments, said printer comprising:

a memory for storing said image data;

means for receiving said image data transferred from said host computer system and storing said image data into said memory means;

a cathode ray tube for transferring image line segments of said image onto said media as said media moves across said cathode ray tube, wherein image data being transferred is used to illuminate at least one phosphor row on an inside surface of said cathode ray tube to form said image line segments;

at least one filter attached to an outside surface of said cathode ray tube between said at least one phosphor row and said print media; and processing means operatively engaged with said memory means and with said image transfer means for retrieving said image data from said memory means, for decomposing said image data into horizontal image segments, and for transferring said horizontal image segments to said cathode ray tube thereby to transfer said image segments to said media.

2. The printer of claim 1 wherein said at least one filter is bonded to an outside face of said cathode ray tube.

3. The printer of claim 2 wherein said at least one filter is bonded using chemical grafting.

4. The printer of claim 2 wherein said at least one filter is bonded by evaporation.

5. The printer of claim 1 wherein each of said at least one filter comprises a plurality of filters attached to require light emitted by a phosphor to pass through each of said plurality of filters.

6. The printer of claim 5 wherein said plurality of filters comprises a long pass filter and a short pass filter to provide a band pass filter.

7. The printer of claim 1 wherein said phosphor rows comprise a monochrome phosphor, and further wherein said at least one filter alters light emitted by said monochrome phosphor to provide color for exposing said print media to print in color.

8. The printer of claim 1 wherein said phosphor rows comprise a plurality of color phosphor rows, and wherein said at least one filter alters light emitted by said plurality of color phosphor rows to spectrally match colors required to expose said print media.

9. The printer of claim 1 further comprising a fiber optics faceplate between said cathode ray tube and said at least one filter.

10. The printer of claim 9 further comprising at least one spacer located to cause a separation between said at least one filter and said print media.

11. The printer of claim 10 wherein said spacer comprises an edge of said at least one filter.

12. The printer of claim 1 further comprising at least one spacer located to cause a separation between said at least one filter and said print media.

13. The printer of claim 1 further comprising a lens between said at least one filter and said print media.

* * * * *